E. Samson,
Sawing Shingles,
No. 904,  Patented Sept. 5, 1838.
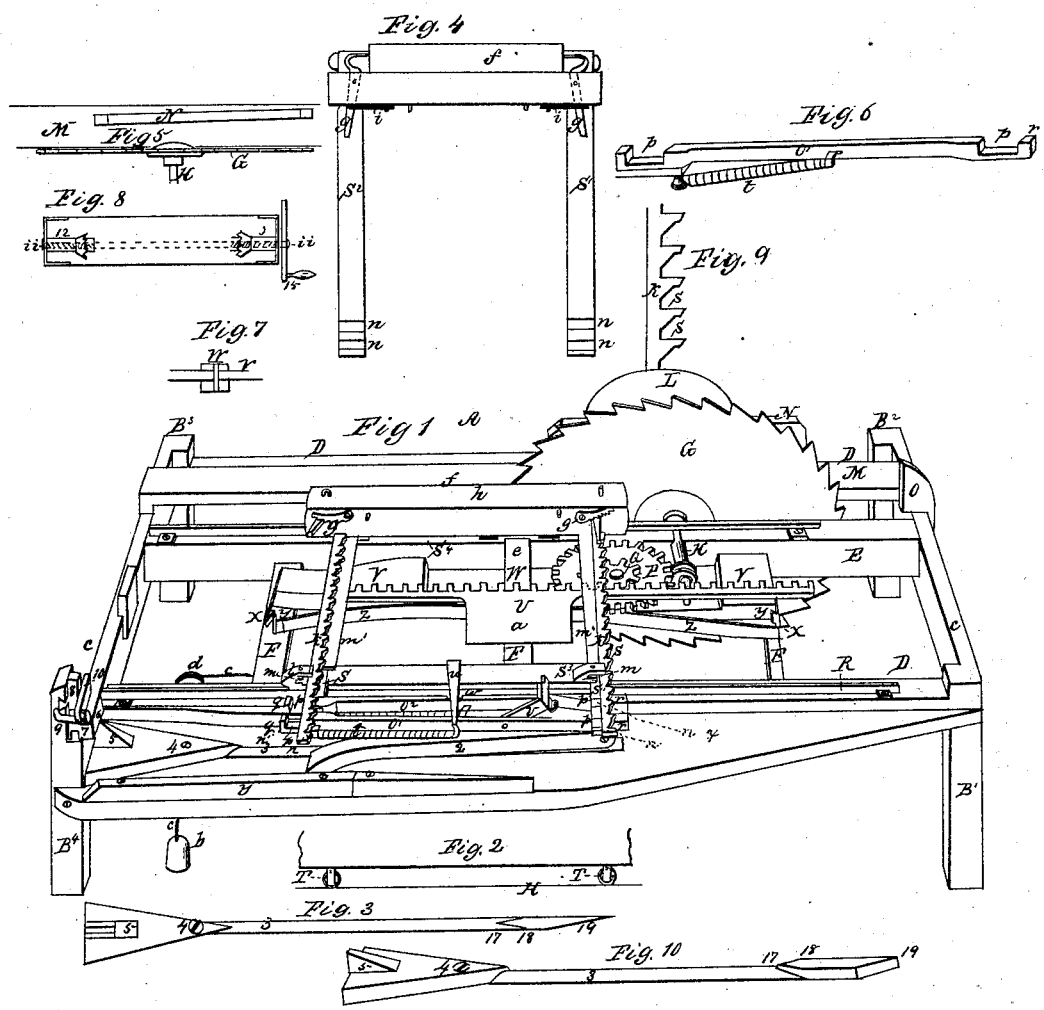

UNITED STATES PATENT OFFICE.

ELNATHAN SAMSON, OF PLYMOUTH, NEW HAMPSHIRE.

MACHINE FOR SAWING SHINGLES.

Specification of Letters Patent No. 904, dated September 5, 1838.

*To all whom it may concern:*

Be it known that I, ELNATHAN SAMSON, of Plymouth, in the county of Grafton and State of New Hampshire, have invented a new and useful Improvement in Machines for the Manufacture of Sawed Shingles, called the "Shingle-Machine;" and I do hereby declare that the following is a full and exact discription.

The nature and purpose of my invention and improvement consists in the diminished expense of my improved machine, in its diminished size and weight—it being non-portable, requiring less room in transportation and in operation, it manufacturing the shingle with greater certainty and more uniformity and accuracy; in an easier and more expeditious construction of the machine, many of its parts and much of its materials being of cast iron—its greater simplicity and durability, and its less liability to get out of repairs. I proceed to describe its construction and operation, to enable those skilled in the art, to make and use my invention.

The frame A, Fig. 1, is of wood, standing on four posts B, is about four feet long and three feet wide, with wide bars C, edge up, across each end at top, and bars D, from end to end on each side, with an intermediate bar E from end to end, a little from the center toward the saw side of the machine, the outer bars in width and thickness proportioned as five to three,—the one D on the jaw-side sunk below the end bars, the thickness of it, the other about half its thickness,—the intermediate bar of the same proportion, and laid even with the end bars. Three short bars F of smaller size, extend from the intermediate bar to the side bar farthest from the saw, the outer ones equidistant from the end bars, and about one quarter's length of the machine distant, the middle one half way between them.

The jaw G is a circular-hung perpendicularly, about a third length of the machine from the head of it, within about an inch of the intermediate long bar, one end of its axle H rests in an elevation of wood fastened on the outer side bar of equal height with the end bars, movable at pleasure so as to regulate the direction of the jaw, and on the other side of the jaw the axle rests in the intermediate long bar E, beyond which it extends about one quarter its length, having on it, near the inner end, is a spiral worm or screw K. Just within the outer bar, on the saw side, is the drum L, and between that and the jaw is a horizontal bar M from end to end of the machine, of width and thickness proportioned about nine to one, width up, and elevated so as to be even with the top of the largest central bulge of the jaw, with a guide of wood N about two feet long, five inches high and three quarters of an inch thick fixed upon its edge up near the drum between that and the jaw, to direct the shingle clear of the drum, as it is thrown from the jaw, and a similar guide O placed in the rear of the saw about one foot high, five inches wide and the same thickness with the other guide, fixed edge toward the jaw and end up to clear the shingle from falling in contact with the back of the saw and being thrown forward by it.

A wheel P about eight inches in diameter, with forty cogs, is placed horizontally on the side of the axle toward which it turns, so as to have the spiral worm on it play into the cogs, and so depressed, that when the carriage advances, it clears it above, and upon this wheel a smaller concentric wheel Q of about four inches diameter is fixed, having cogs fitted to the cogged shaft or rack about to be mentioned, the diameter of the smaller wheel variable at pleasure according to the desired speed of the carriage. The axle of the two wheels is fixed, but is movable at pleasure toward or from the cogged shaft or rack. The carriage tracks R of cast iron and about three feet eight inches long, are laid on the intermediate long bar and the side bar farthest from it, and are squared at top. The carriage S is of cast iron, of about twenty inches long and nearly a square, of one casting with four bars about two and a half inches wide and three quarters of an inch thick width up, and moves on the track, upon four cast iron friction rollers T Fig. 2 fastened to it under the four corners. Under the carriage, depressed about an inch below it, is a cast iron shaft or rack V fixed, about twenty eight inches long two inches wide and three quarters of an inch thick, extending forward parallel with the side bars of the carriage and nearly midway between them, from the rear bars of the carriage, the edge of it toward the saw cogged, fixed width up. When the saw is turned forward the spiral worm turns the larger wheel and with it the smaller wheel, the cogs of which play into the meshes of the cogged shaft or rack and the carriage is made to advance, the wheel in contact with the worm turning toward the saw. The axle of the wheels is fixed perpendicularly in a broad lever of wood V about half way between the saw axle H and the intermediate short bar F of the frame—
the lever reaches from the rear bar to the forward one and rests upon the three bars parallel with the side bar of the frame, having its perpendicular fulcrum W fixed in the intermediate short bar on which it plays horizontally under said short bar so as to carry the smaller wheel and the cogged shaft or rack alternately into and out of gear. The lever is worked thus: At each end of it is a steel spring X extending around and upon the end and beyond it, horizontally at right angles with it in the direction from the saw, having a catch on the inner side of it at the end. As the ends of the lever move in that direction, the catch is thrown upon a small perpendicular post Y of iron, fixed in the outmost short bar of the frame. On the edge of the lever opposite from the saw are two larger horizontal steel springs ZZ fixed to the lever on each side of the intermediate short bar, and extending so far along the lever as when compressed toward it to reach its ends. On the edge of the cogged shaft or rack opposite from the wheel is a projection $a$ of the shaft or rack extending far enough to clear, when bent downward at right angles, the larger wheel, as the carriage advances and retreats, and is called a guide, and so long as to reach with its ends the springs on the extremes of the lever, as the carriage completes its advance and retreats as the carriage advances, the guide compresses toward the lever the forward side spring, passes the end of it, strikes the end spring of the lever from its catch, when the side spring, restrained on that side by the guide, throws backward the end of the lever which forces the rear end of the lever forward, and catches its end spring on the iron post Y. The cogged shaft or rack and the smaller wheel are thus thrown out of gear and the carriage left free to retreat. It retreats by force of a weight $b$ suspended by a cord $c$ fastened to a knob underneath the front bar of the carriage, which is drawn over a pulley $d$ in the rear end of the right hand side bar of the frame. As the carriage retreats, the guide in like manner compresses the other side spring of the lever and strikes from catch the other end spring, forces backward the rear end of the lever and forward the fore end, which brings the cogged shaft or rack and the smaller wheel into gear, and the carriage again advances. The lever is confined by a guard of wood $e$ fastened above it and on each side of it, at its center on the intermediate short bar, within which it moves, and in which, above it, the fulcrum is fastened. The shingle bolt $f$ is held by the ends, to the jaw, by two movable iron claws $g$ $g$ passing through the head block $h$ near the ends. These claws are opened and shut thus: A cylindrical rod $i$ $i$ of iron passes through the head block from end to end, parallel with it, having upon it, where the claws come in contact with it, two spiral worms or screws 12 13 obliquely cut, one to the right hand, the other to the left, and so in contact with the legs of the claws 14 through which it passes and in which, at the point of contact, are corresponding screws or nuts, that when the rod is turned in one direction, the claws are opened asunder, and when turned in the other direction, are shut again into the ends of the bolt. The rod is turned by a crank or wheel and pin 15 of iron at the right hand end of the rod. See Fig. 8.

Two cast iron transverse shafts or racks $k$ $k$ fixed at the ends in and under the head blocks, about twenty one inches long and an inch and an half wide and three quarters of an inch thick, extend on the side of the block opposite from the bolt, at right angles with the block. On the front and rear carriage bars are extended two cast iron guides $m'$ $m''$ the length of the bars, and fixed on the inner sides of the bars, one forward and the other behind the transverse shafts or racks, as they move to right and left, on the carriage with the head block. These shafts or racks are cogged on the forward edges, lying width up. Cast iron guides also $l$ $l$ are fixed on each end of the right hand side bar of the carriage, limiting behind and above them, the transverse shafts or racks, as they move to right and left, and having in each guide a horizontal friction roller $m$ $m$ fixed, on which the back of the shafts or racks plays or runs.

The front and rear carriage bars $S^1$ and $S^2$ extend to the right beyond the square carriage, and have in each of them, without the square, in that direction, two sunk spaces $p$ $p$, Fig. 4 about two inches long and three quarters of an inch in width and depth. The two in the front bar $S^1$ are farther apart than the two in the rear bar $S^2$ about as the shingle butt exceeds, in thickness, the point,—the two latter being about an inch apart—those nearest the right hand side bar, in both front and rear bars, equidistant from the side bar. In these sunk spaces are two cast iron bolts $o^1$ $o^2$, Fig. 1, laid, about twenty one inches long extending from front to rear carriage bars, and a little beyond each, about an inch and a half deep and three quarters of an inch thick. In these bolts are sunk spaces $p$ $p$ Fig. 6 in the upper sides of them, directly over those *n n* in the carriage bars Fig. 4 cut across in the bolts, about three quarters of an inch deep, in which the transverse shafts or racks play from right to left and back, the termination of the spaces behind the shafts or racks, being a square or head *q q* and that in the cogged side of the shafts or racks, a beveled tenin (Fig. 6, *r*)—the point of it so formed, that the shortest length is an inch and five eighths and the longest two inches, and so as to get firmly in the meshes *s* of the transverse shafts or racks *k k* Figs. 1 and 9. These meshes are a perpendicular cut on the right hand side, of about five eights of an inch,—then a horizontal cut to left, at the foot of about an eighth of an inch,—then are oblique cut, to the left, of about half an inch, upward at an angle of about 45 degrees,—then a perpendicular of about an eighth of an inch—then an oblique to the left of about a quarter of an inch, upward at an angle of about thirty degrees, to the points of the cog. These bolts are forced into the meshes of the shafts or racks, and held there, till struck out by the retreat of the carriage, as hereafter described, by two strong spiral steel springs *t t*, fastened to them underneath, at about their center, at one end, and at the other upon knobs under the sunk spaces in the rear bars of the carriage. An iron stay *w* fixed to about the middle of the right hand side bar of the carriage, extends upon and across the bolts, having in its under part two notches shaped to receive and confine these bolts; and to keep them from any lateral motion or canting to one side, and a little forward of the stay is an iron button *v*, which is hung on a hinge or pivots, fixed horizontally in the inside of the outer bolt, movable perpendicularly back and forward, and bent inward, toward the end of it, at right angles, in such form, that the bent portion of it reaches across the inner bolt, and when down lies in a notch *w* in the inner bolt, made to receive it, just forward of the stay. The right hand rear corner post B⁴ of the machine rises a little above the others and stands about the thickness of the side bar of the machine, to the right of the bar. From this post forward and extending to the right a little beyond it, is a wing *x* reaching along by the right hand side bar of the machine, to the fore end of it, where it terminates at a point, the slope commencing about two thirds the way. A rail *y* is on the outer edge of the wing, extending from the rear end of it, about one third the length of the frame, parallel with its side bar—then departing slightly outward. This rail, together with the upper portion of the side bar of the machine, form the limits, within which are worked the lever and lever-mover about to be described, on the said wing. The lever 3 Figs. 1 and 3 and 10 is placed about the middle of the wing, and extends from the rear right hand post of the machine, about two thirds the wing's length, having its fulcrum 4 fixed perpendicularly on the wing, about six inches forward of said rear post. It plays horizontally to right and left,—the end of its next post is broad, and it diminishes with a constant tapering, equal on both sides, to the fulcrum and on the upper side of the lever, a little beyond the fulcrum, till it comes to a point, the lower side continuing a shaft, rounded on the upper part and of less thickness than the ends 4 and 17, and flat on the under, and of the same thickness as it is at the fulcrum. It maintains this form to near the end of the rail, when, on the upper side, it increases from a point 17 regularly to the end of the rounded part, as far as 18 from the sides run parallel about one inch and then it runs off to a point on one side as the under part continuing to be the shaft as above said. In the upper side of the end of the lever, next the said rear post, is a perpendicular tenon of wood 5, which enters a mortise 6, in a slide 7 of wood, which is about five inches long, an inch and a half wide and an inch thick, and in the center of the slide is fixed a perpendicular post 8 of wood, about three inches high, an inch wide and three quarters of an inch thick, standing above the center of the broad end of the lever, and when the lever is at the rests in the center of the wing this post 8 stands corresponding to the rear post of the machine, and is a little broader than the head of either of the said bolts. The lever-mover 2 is a shaft of wood about twenty inches long, an inch and a half wide and an inch thick, being a little larger at the head than elsewhere—hung at the tail under the right hand end of the fore bar of the carriage, movable perpendicularly, as well as horizontally, in the point where it is hung—the head resting unfastened on the way beside the lever. It is hung directly under the space between the forward ends of the cast iron bolts. As the carriage retreats, the head of the lever-mover is thrust along on the wing, by the side of the lever, till it comes to press against the side of the enlarging part of it and forces it aside. As the carriage advances, the lever-mover is withdrawn, crosses the shaft of the lever to the other side of it, and the head drops on the wing, on the other side, of the lever, and as the carriage again retreats, the head of the mover is thrust along by that other side of the lever, and forces it aside, the other way, and thus to right and left alternately, at every retreat of the carriage, and the horizontal play of the lever head is just wide enough to bring the post 8 in rear of one of the other cast iron bolts alternately, which by this means are alternately struck out of gear with the transverse cogged shafts or racks,—by which means and by the action of the spiral steel springs, the cogged shafts or racks alternately advance, regularly, toward the saw, presenting the shingle bolt to it, so as to cut alternately the butt and point of the shingle.

In the right side of the rear right hand post of the machine, near the top is inserted a small shank of iron 9 and bent forward, near its insertion, at right angles, and extending forward far enough to have the guard or button 10, which is hung upon it and moves circularly in a perpendicular, fall at right angles to the bent part of the shank, before the post 8, the button being long enough to receive and stay both heads of the bolts of cast iron as the carriage retreats, and hold them forward, out of gear with the transverse shafts or racks so that these may freely retreat from the saw, for a fresh shingle bolt. This retreat is caused by hand.

What I claim here as my invention and desire to have secured to me by Letters Patent, is—

The before described mode of setting forward the transverse cogged racks or shafts for setting the shingle bolt alternately for point and butt. I mean only to claim the application of the spiral springs to the cast iron bolts in the manner and for the purpose herein described, and also the peculiar form of the teeth in the transverse racks as herein described.

ELNATHAN SAMSON.

Witnesses:
N. P. ROGERS,
WM. W. RUFIN.